United States Patent
Roberts et al.

(10) Patent No.: US 8,340,856 B2
(45) Date of Patent: Dec. 25, 2012

(54) OFF-BOARD DEVICE WITH READ/SCROLL ACTUATOR

(75) Inventors: Robert A. Roberts, South Euclid, OH (US); Hamid Namaky, South Russell, OH (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 13/454,677

(22) Filed: Apr. 24, 2012

(65) Prior Publication Data
US 2012/0215401 A1    Aug. 23, 2012

Related U.S. Application Data

(62) Division of application No. 11/024,454, filed on Dec. 30, 2004, now Pat. No. 8,165,741.

(51) Int. Cl.
*G06F 7/00* (2006.01)
*G06F 11/30* (2006.01)
*G01M 17/00* (2006.01)

(52) U.S. Cl. .................. 701/29.1; 701/31.4; 340/438

(58) Field of Classification Search ............... 701/29.1, 701/29.7, 31.4, 31.7, 33.2, 33.3, 33.4, 33.5, 701/33.6; 340/425.5, 438, 439; 307/9.1, 307/10.1
See application file for complete search history.

(56) References Cited

U.S. PATENT DOCUMENTS

| | | | |
|---|---|---|---|
| 4,267,569 A | 5/1981 | Baumann et al. |
| 5,541,840 A | 7/1996 | Gurne et al. |
| 6,687,584 B2 | 2/2004 | Andreasen et al. |
| 6,947,816 B2 | 9/2005 | Chen |
| RE39,619 E | 5/2007 | Andreasen et al. |
| 2004/0016804 A1 | 1/2004 | Namaky et al. |
| 2004/0054503 A1 | 3/2004 | Namaky |
| 2004/0227523 A1 | 11/2004 | Namaky |
| 2004/0230356 A1 | 11/2004 | Namaky |
| 2006/0012315 A1 | 1/2006 | McDonough et al. |
| 2006/0027650 A1 | 2/2006 | Andreasen et al. |

*Primary Examiner* — Thomas Tarcza
*Assistant Examiner* — Edward Pipala
(74) *Attorney, Agent, or Firm* — Baker & Hostetler, LLP

(57) ABSTRACT

A single input having multiple functions is provided. The single input having multiple functions may be used on off-board tools. In accordance with one embodiment, an off-board tool having a read/scroll actuator is provided. The read/scroll actuator, upon being actuated, performs either a read function or a scroll function. Another embodiment of an off-board tool having a display and capable of receiving information is provided. The off-board tool includes a contextual actuator having a first and a second mode. Actuation of the actuator in the first mode effectuates retrieval of information. Actuation of the actuator in the second mode effectuates display of at least a portion of the retrieved information. In accordance with another embodiment, an off-board device is provided. The off-board tool includes a display, read logic, scroll logic and a read/scroll actuator.

20 Claims, 6 Drawing Sheets

OFF-BOARD DEVICE WITH READ/SCROLL ACTUATOR

CROSS-REFERENCE TO RELATED APPLICATIONS

This application claims priority to and is a divisional of U.S. application Ser. No. 11/024,454, entitled "Off-Board Device with Read/Scroll Actuator," filed Dec. 30, 2004, now U.S. Pat. No. 8,165,741, issued Apr. 24, 2012, the disclosure of which is hereby incorporated by reference in its entirety.

FIELD OF THE INVENTION

The present invention relates to electronic testing devices, and more specifically to off-board devices, such as scan tools and code readers.

BACKGROUND OF THE INVENTION

Modern vehicles typically include a vehicle diagnostic system having one or more computer modules, or on-board devices, such as, engine control units and transmission control units. The computer modules communicate over a data bus. A data link connector (DLC) on-board the vehicle, is also connected to the data bus. Off-board tools (OBT,) such as, for example scan tools, code readers, and inspection maintenance tools, are configured to connect with the vehicle diagnostic system via the DLC.

Electronic signals such as, information or data, indicating the status of various vehicle systems (e.g., Diagnostic Trouble Codes, or DTCs) are communicated from the vehicle diagnostic system to the OBT via the data bus and the DLC. Among other things, the OBT reads and displays the diagnostic information (e.g., the DTCs) indicating the status of the vehicle systems.

User interfaces of OBTs are often cumbersome, confusing, complicated and/or crowded. Numerous buttons are often provided to perform numerous functions, many of which are sparsely used.

SUMMARY OF THE INVENTION

A single input having multiple functions is provided. The single input having multiple functions may be used on off-board tools. In accordance with one embodiment, an off-board tools having a read/scroll actuator is provided. The read/scroll actuator, upon being actuated, performs either a read function or a scroll function.

In accordance with another embodiment, an off-board tool having a display and capable of receiving information is provided. The off-board tool includes a contextual actuator having a first and a second mode. Actuation of the actuator in the first mode effectuates retrieval of information. Actuation of the actuator in the second mode effectuates display of at least a portion of the retrieved information.

In accordance with another embodiment, an off-board tool is provided. The off-board tool includes a display, read logic, scroll logic and a read/scroll actuator.

In accordance with another embodiment, an off-board tool is provided. The off-board tool includes a display, a read means, a scroll means and a read/scroll means.

DETAILED DESCRIPTION

The following includes definitions of exemplary terms used throughout the disclosure. Both singular and plural forms of all terms fall within each meaning Except where noted otherwise, capitalized and non-capitalized forms of all terms fall within each meaning:

As used herein, "logic" is used generically and includes but is not limited to hardware, software and/or combinations of both to perform a function.

As used herein, "software" is used generically and includes but is not limited to one or more computer executable instructions, scripts, routines, algorithms, modules or programs (including separate applications or from dynamically linked libraries) for performing functions as described herein. Software may also be implemented in various forms such as a servlet, applet, stand-alone, plug-in or other type of application. Software can be maintained on various computer readable mediums as known in the art.

Figure 1:
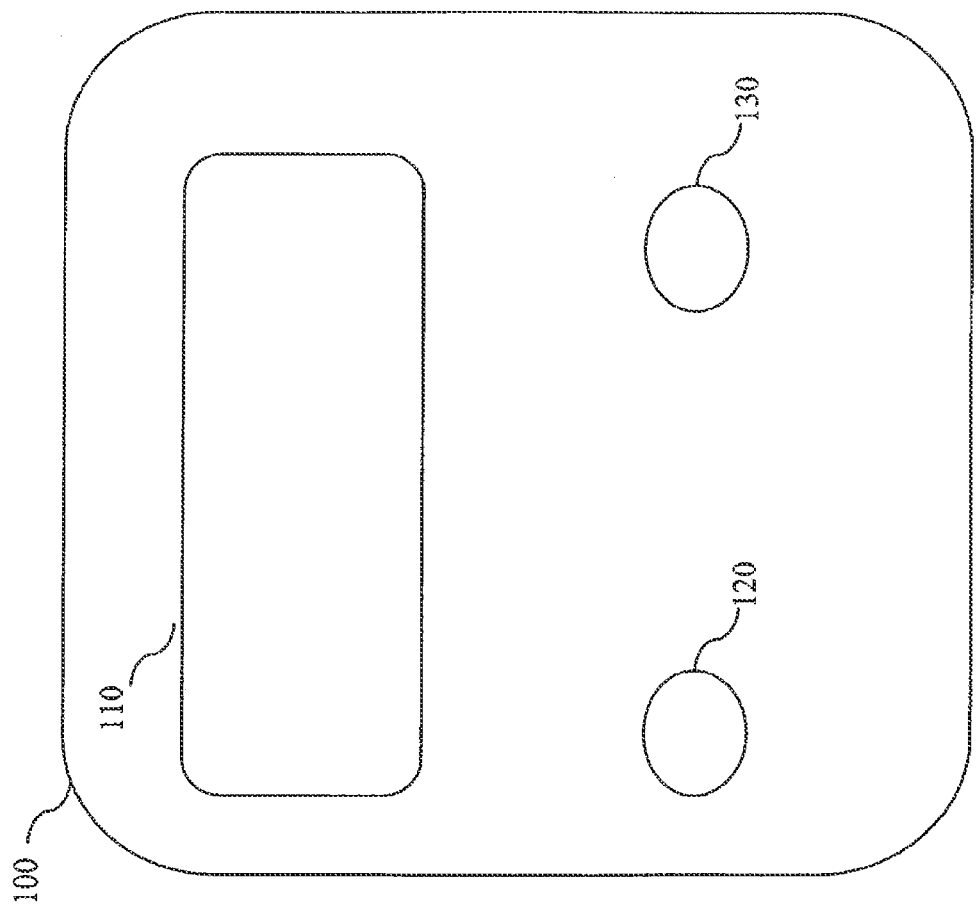
FIG. 1 is a front view of an exemplary OBT including a read/scroll actuator.

With reference to FIG. 1, an exemplary OBT with a read/scroll actuator is illustrated. It will be appreciated that OBT 100 is any suitable OBT, including but not limited to a scan tool, a code reader and any instrument, hand-held or otherwise, which is used to extract data or information from a vehicle on-board diagnostic system, such as for example DTCs. Embodiments set forth herein are illustrated with respect to an exemplary OBT 100, although it will be appreciated that the embodiments need not be limited to any particular OBT.

Exemplary OBT 100 includes a display 110, a read/scroll actuator 120 and, optionally, an erase actuator 130. Display 110 is any device or mechanism capable of displaying information, such as, for example, one or more DTCs, or parts thereof. Any suitable display is used, including but not limited to an LCD screen, an LED display and a print-out.

Read/scroll actuator 120 is any suitable input, electronic or manual, including a key, a button, a toggle, a flip switch touch screen, or any other device. In embodiments described herein, a read/scroll button 120 is used as an exemplary actuator, though it will be appreciated that this disclosure need not be so limited.

Pressing read/scroll button 120 (or, actuating read/scroll actuator 120) causes OBT 100 to perform one of two functions—either a read function or a scroll function. In performance of the read function (or, during the "read mode"), the OBT 100 reads data, or information, such as, for example, one or more DTCs, from the vehicle diagnostic system. The use or the term DTCs is not meant to limit the scope of the invention, as any information may be retrieved and displayed. As described further herein, the DTC code(s) are optionally stored in an internal memory of the off-board tool and one DTC is displayed on display 110 at a time. Optionally, a group or plurality of DTCs, or other information is displayed on one screen at one time.

In performance of the scroll function (or, during the "scroll mode"), the OBT 100 scrolls through one or more DTCs so that one, or multiple, DTC(s) are displayed at a time on display 110. In an embodiment, when more than one DTC is stored in the OBT's internal memory, each performance of the scroll function displays another stored DTC. DTCs are optionally ordered in their display during the scroll function. For example, each performance of the scroll function displays the "next" DTC in the sequence of DTCs in memory. For the purposes of this example, assume that three DTCs are stored in the internal memory of the OBT and sequenced in any suitable manner (such as, e.g., by the order in which they were read, the order in which they were outputted, the order in which they occurred, etc.); each performance of the scroll function displays the "next" DTC in the sequence. In an embodiment, the DTCs are continually scrolled, wherein once the end of the sequence is displayed, the first DTC in the sequence is displayed upon the next performance of the scroll function. Optionally, a means for scrolling back to the previous display is provided, such as, for example, holding the scroll actuator down for a specified period of time. In an embodiment, multiple DTCs are displayed on each screen and the scroll function may scroll to another set of DTCs or move one DTC out and the next DTC in.

In an embodiment, performance of the read function or the scroll function upon pressing of the read/scroll button 120 is contextually dependent. For example, in an embodiment, performance of either the read or the scroll function is dependent upon the contents of the internal memory of the OBT, or dependent upon the contents of the display 110. If the internal memory, of the scan tool does not contain any DTCs to display, or no DTCs are displayed on the screen actuating the read/scroll button 120 performs the read function, which reads information, such as, one or more DTCs. If the internal memory contains a plurality of DTCs, actuating the read/scroll button 120 performs the scroll function, which displays the "next" DTC on the display 110. In the event that there is one DTC in memory, and that DTC is currently displayed on display 110, actuating the read/scroll button 120 optionally performs the scroll function and redisplays the currently displayed DTC, and further optionally indicates that no additional DTCs are in memory. Optionally, similarly if a DTC is displayed, actuating the read/scroll button 120 perform the scroll function. Again, of course, as with the other embodiments described herein, other information or data can be retrieved and displayed in a similar manner.

In another embodiment, performance of the read function or the scroll function is dependent upon the amount of time the read/scroll button 120 is actuated. For example, a brief pressing of the read/scroll button 120 performs a scroll function, while a longer pressing of the read/scroll button 120 performs a read function. Any suitable period of time for pressing is used. For example, any pressing of read/scroll button 120 for a period of time between about 2 seconds and about 10 seconds, or greater, effectuates performance of the read function. Any DTCs currently stored in the OBT's internal memory are optionally erased or overwritten by newly-read DTCs. In an embodiment, this "cut off" time is about 3 seconds. Any pressing of the read/scroll button 120 for a period of time less than the "cut off" time effectuates the scroll function.

In another embodiment, performance of the read function or the scroll function is dependent upon both the amount of time the read/scroll button 120 is pressed and upon the contents of the OBT's internal memory or the content of the OBT's display. For example, if the internal memory is empty, or no vehicle information is currently displayed, pressing the read/scroll button 120 effectuates a read function, regardless of how long the button is pressed. If a plurality of DTCs currently exists in the internal memory or one or more DTCs are displayed on the display, the function effectuated is dependent upon the amount of time the read/scroll button 120 is pressed. For each shorter press, the scroll function is effectuated. For longer presses, the read function is effectuated. If only one DTC is in memory, and that DTC is currently being displayed on display 110, a longer press of the read/scroll button 120 optionally effectuates a read function, while a shorter press (e.g., one below the pre-determined "cut off" time) optionally performs no function or effectuates the scroll function (thus redisplaying the currently-displayed DTC, with or without an indication that no additional DTCs are in memory) or otherwise indicates that no additional DTCs are in memory for display. While the descriptions above illustrate exemplary embodiments of contextually-dependent performances of either the read mode or the scroll mode, it will be appreciated that any suitable contextually-dependent rules are optionally used.

Erase actuator 130 is any suitable input, electronic or manual, including a button, a key, a toggle, a flip switch, touch screen or any other device. In embodiments described herein, an erase button 130 is used as an exemplary actuator, though it will be appreciated that this disclosure need not be so limited.

Pressing erase button 130 (or, actuating erase actuator 130) causes OBT 100 to perform an erase function; namely, to erase DTCs contained in the vehicle diagnostic system, and, optionally, to clear the display 110 and/or the OBT's internal memory. Erase button 130 is actuated in any suitable manner. For example, erase button 130 is optionally configured to effectuate an erase function only after the erase button 130 is pressed for a pre-determined amount of time or longer. In this example, pressing the erase button 130 for a shorter period of time (e.g., about 5 seconds or less), does not effectuate the erase function. Only pressing the erase button 130 for a longer period of time effectuates the erase function. While an exemplary "cut off" time of 5 seconds is illustrated, it will be appreciated that any suitable amount of time is optionally used. Suitable "cut off" times are between about 1 second and about 30 seconds.

Figure 2:
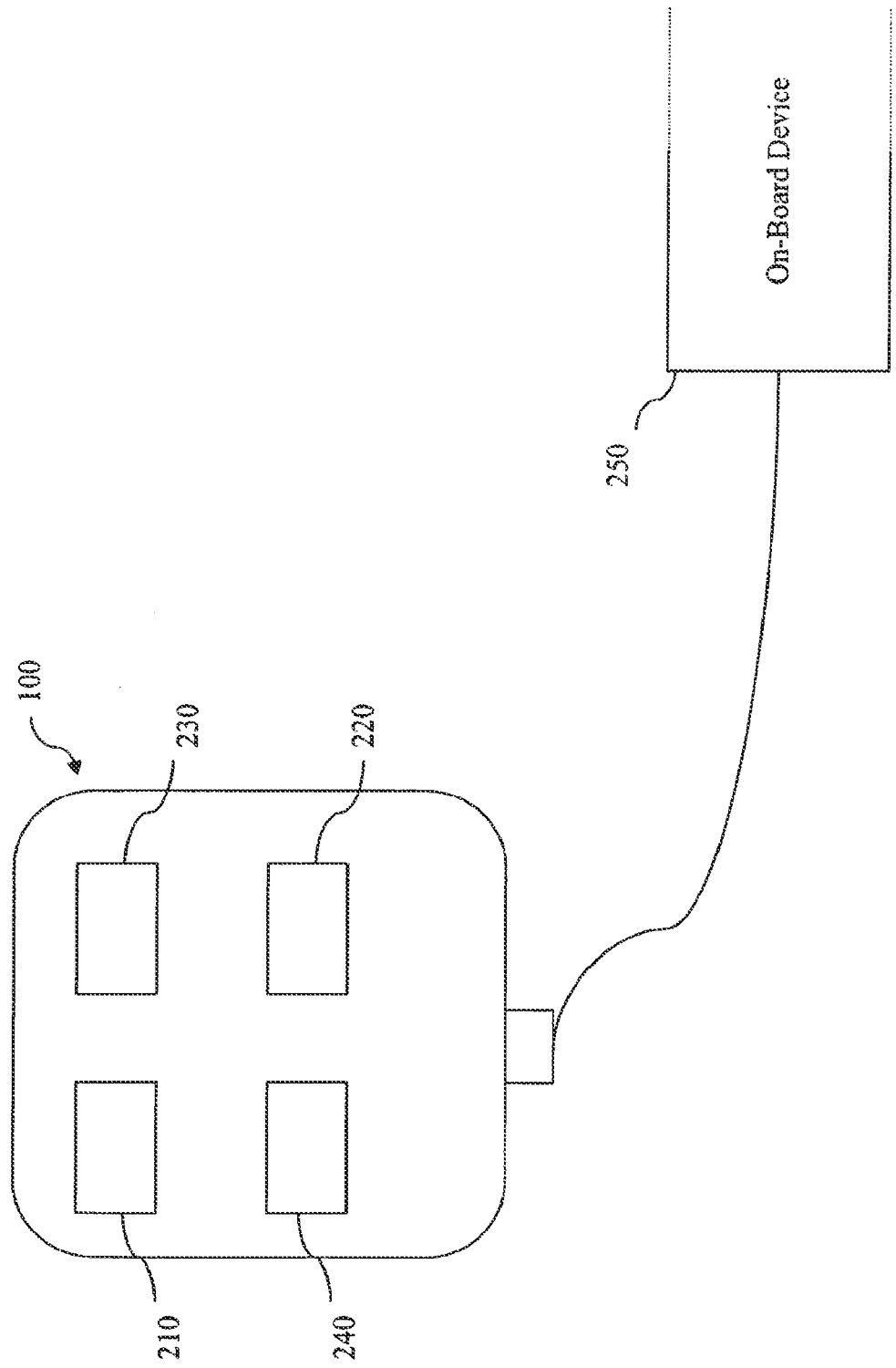
FIG. 2 is a system view of an exemplary OBT communicating with a vehicle diagnostic system.

With reference to FIG. 2, in an embodiment, OBT 100 electronically communicates with vehicle diagnostic system 250 to receive data or information, such as, one or more DTCs there from. OBT 100 optionally includes one or more of internal memory 210, one or more processors 220, read logic 230 and scroll logic 240. Internal memory 210 is any memory device capable of storing information or data, such as, one or more DTCs. Internal memory 210 optionally stores information, such as, one or more DTCs received from the vehicle diagnostic system e.g., from performance of a read function. Internal memory 210 is accessed by processor 220 in performance of either or both a read function or a scroll function. Processor 220 is any processor capable of performing read logic or scroll logic (described below) and further capable of electronically accessing internal memory 210 in performance thereof.

Read logic 230 includes any suitable steps, methods, processes and/or software for performing a read function. For example, read logic accesses, e.g., vehicle diagnostic system 250 and retrieves information, such as, one or more DTCs there from. The information is stored in internal memory 210. Information previously stored in internal memory 210 is replaced by new information, or is optionally erased. Any information previously displayed is optionally removed from the display. One retrieved piece of information is optionally displayed on the display.

Scroll logic 240 includes any suitable steps, methods, processes and/or software for displaying information, such as, at least one DTC on the display. For example, wherein a plurality of DTCs are stored in internal memory 210, scroll logic retrieves the "next" DTC in memory and displays it. Sequencing of the DTCs in memory, and thus the determination of which DTC is "next," is accomplished in any suitable manner, including as described herein. Scroll logic 240 optionally continually loops through the DTCs in memory, wherein upon displaying the "last" DTC, the next DTC displayed is the "first" DTC in the sequence of DTCs in internal memory.

Figure 3:
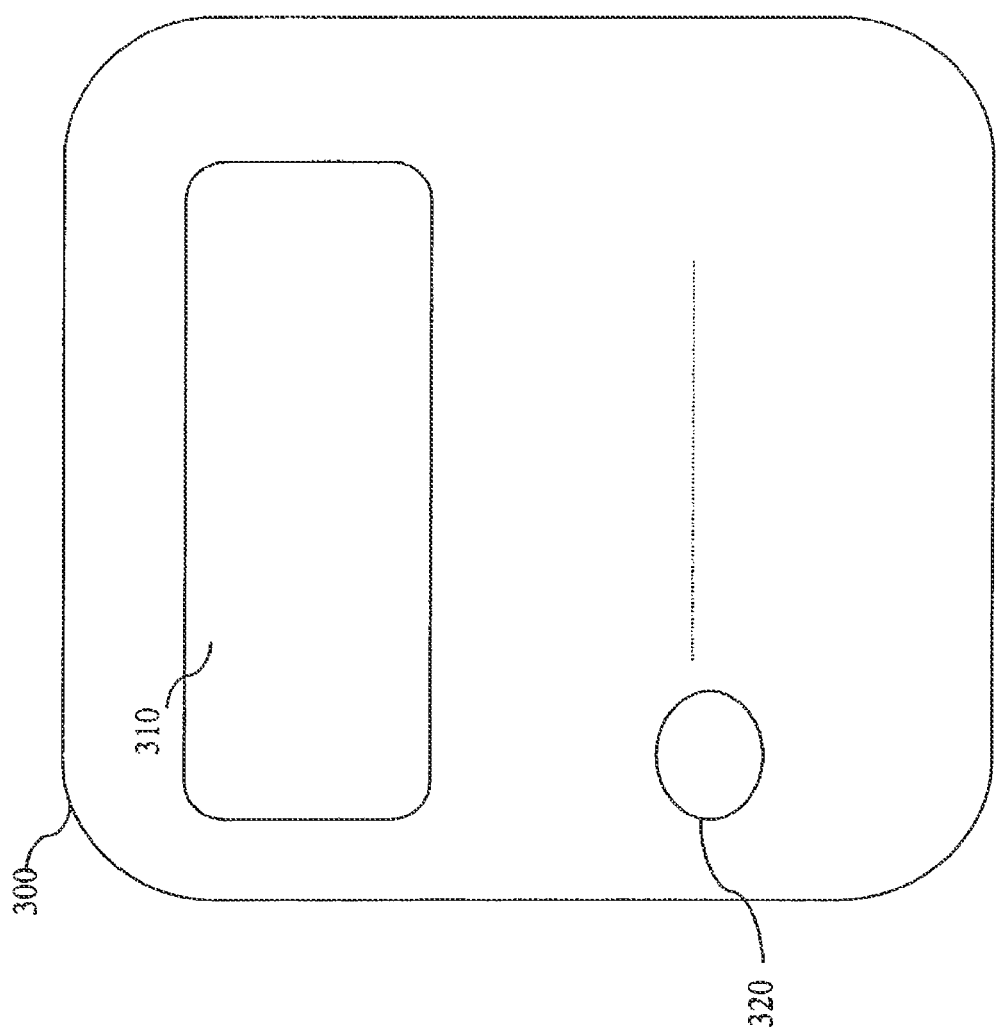
FIG. 3 is a front view of an exemplary OBT including a programmable key, or hot key.

With reference to FIG. 3, in an embodiment, an OBT with a programmable actuator is illustrated. It will be appreciated that OBT 300 is any suitable OBT, including but not limited to a scan tool, a code reader and any instrument, hand-held or otherwise, which is used to extract data or information from an on-board vehicle diagnostic system, such as, for example, DTCs. Embodiments set forth herein are illustrated with respect to an exemplary OBT 300, although it will be appreciated that the embodiments need not be limited to any particular OBT.

Exemplary OBT 300 includes a programmable actuator 320 and, optionally, a display 310. Display 310 is any device capable of displaying information, such as, for example, one or more DTCs, or parts thereof. Any suitable display is used, including but not limited to an LCD screen, an LED display and a print-out.

Programmable key 320 is any suitable electronic or manual actuator, including a key, button, a toggle, a flip switch, touch screen or any other device. In embodiments described herein, a programmable key or button 320 is used as an exemplary actuator, though it will be appreciated that this disclosure need not be so limited.

Pressing programmable key 320 causes OBT 300 to perform the one or more functions which have been programmed to perform upon actuation. Programmable key 320 is a user-defined programmable key. A user selects one or more functions for performance and programs OBT 300 to perform the functions upon actuation of programmable key 320.

Any suitable function, functions or sequence of functions is/are optionally programmed into programmable key 320. For example, suitable functions include but are not limited to, alone or in any combination thereof, read codes, inspection maintenance (I/M) readiness, erase codes, vehicle information, view data, freeze frame, pending codes, oxygen monitor data, diagnostic monitor data, print, contrast adjust, and English/metric setup. An additional example is the service code functions defined in SAE J1979 (incorporated herein by reference) for diagnostic service definitions for ISO 9141-2, ISO 14230-4, SAE J1850, ISO 15765-4 and SAE 1939. For example, the functions optionally include Request Current Powertrain Diagnostic Data (Service $01), Request Powertrain Freeze Frame Data (Service $02), Request Emission-Related Diagnostic Trouble Codes (Service $03), Clear/Reset Emission-Related Diagnostic Information (Service $04), etc.

The functions are optionally programmed in any suitable sequence and further optionally include wait states for, e.g., further user input and/or review. For example, a user may program the OBT 300 to Request Current Powertrain Diagnostic Data, wait for acknowledgement from a user, Request Emission-Related Diagnostic Trouble Codes, wait for acknowledgment from a user, and then Clear/Reset Emission-Related Diagnostic Information upon user input. While this example illustrates three functions with multiple wait states and user input, it will be appreciated that any suitable sequence of functions, including suitable wait states/user input, is optionally used.

The programmed functions are stored in the OBT 300 (described below). Execution (or performance) of the functions commences when the programmable key 320 is actuated by a user. Actuation is optionally achieved by pressing the programmable key 320 one time. Minimal time pressing requirements are optionally employed. For example, actuation of the programmable key 320 optionally requires pressing the key for at least a pre-determined amount of time, such as, e.g., one second. It will be appreciated that any suitable time period is optionally used, including from one-tenth of second up to 10 seconds, and optionally more.

Figure 4:
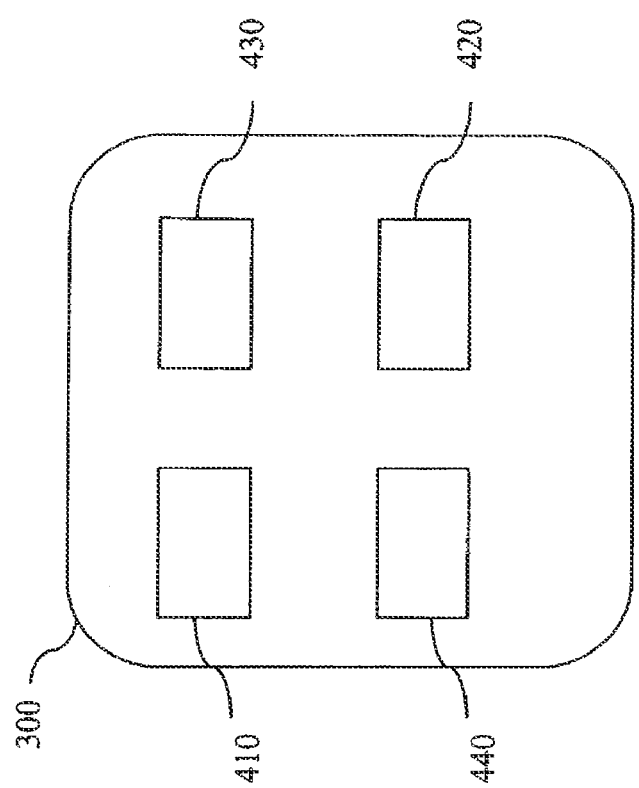
FIG. 4 is an exemplary system diagram of components of an exemplary OBT including a programmable key, or hot key.

With reference to FIG. 4, in an embodiment OBT 300 includes internal memory 410, one or more processors 420, program logic 430 and perform function logic 440. Internal memory 410 is any memory capable of storing one or more functions for performance. Processor 420 is any processor capable of performing the functions stored in the internal memory. Upon actuating programmable key 320, the processor begins execution of the functions programmed and stored in the internal memory.

Program logic 430 includes any suitable steps, methods, processes and/or software for programming one or more functions to be performed upon actuation of programmable key 320. In an embodiment, a user-defined or selected sequence of functions (which are optionally one or more functions further optionally ordered in a sequence) is created on a computing device external to OBT 300. Any suitable computing device is optionally used, including but not limited to a personal computer. In the example of a personal computer, the personal computer optionally runs one or programs which facilitates creation of a function list (or function program or program). The program is exported from the personal computer to the internal memory of the OBT by any suitable mechanism, including but not limited to via a standard I/O port or a DLC. The program remains in the internal memory for execution upon actuation of the programmable key 320. Other means for programming the programmable key 320 include providing a list of available functions and allowing the user to scroll through the list and select desired functions and/or the order the selected functions that are performed upon actuating the programmable key 320.

Perform function logic 440 includes any suitable steps, methods, processes and/or software for performing (or executing) the functions of the program stored in the internal memory. In an embodiment, after actuation of the programmable key 320, perform function logic 440 loads the program and the program is executed by the processor 420 and any peripherals at the processor's direction. Perform function logic 440 optionally facilitates wait state(s) and input from a user during performance of a program.

Figure 5:
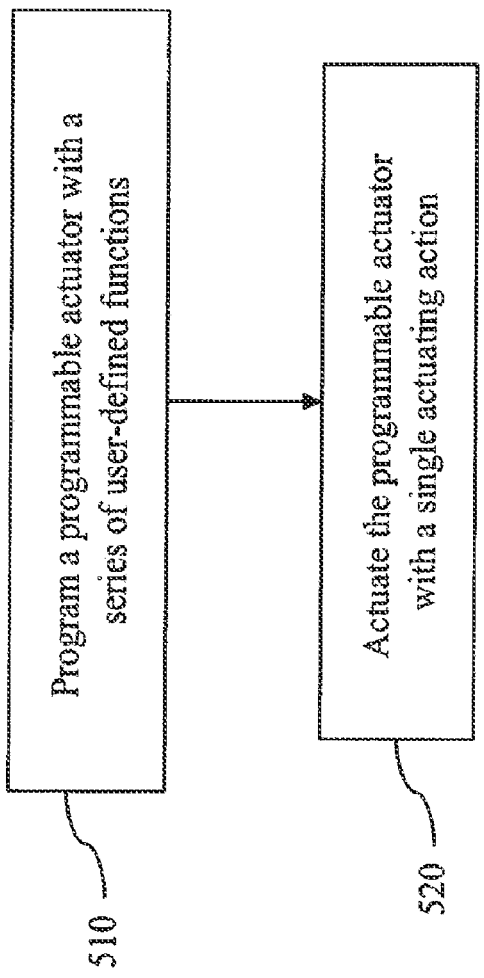
FIG. 5 is a block diagram of an exemplary methodology for actuating performance of a user-defined series of functions for an OBT.

In an embodiment, FIG. 5 shows an exemplary methodology for actuating an OBT to perform a user-defined series of functions. The blocks shown represent functions, actions or events performed therein. If embodied in software, each block may represent a module, segment or portion of code that comprises one or more executable instructions to implement the specified logical function(s). If embodied in hardware, each block may represent one or more circuits or other electronic devices to implement the specified logical function(s). It will be appreciated that computer software applications involve dynamic and flexible processes such that the functions, actions or events performed by the software and/or the hardware can be performed in other sequences different than the one shown.

With reference to FIG. 5, an exemplary methodology is described. At 510, a programmable actuator of an OBT is programmed with a plurality of user-defined functions. At 520, performance of the plurality of user-defined functions is actuated by actuating the programmable actuator using a single actuating action. Any suitable actuating action is optionally used, including pressing the programmable actuator.

Although the flow chart herein shows an exemplary order of execution, it is understood that the order of execution for other embodiments may differ from that which is depicted. Also, two or more blocks shown herein may be combined and/or executed concurrently or with partial concurrence. It is understood that all such variations are within the scope of various embodiments of the present invention.

Figure 6:
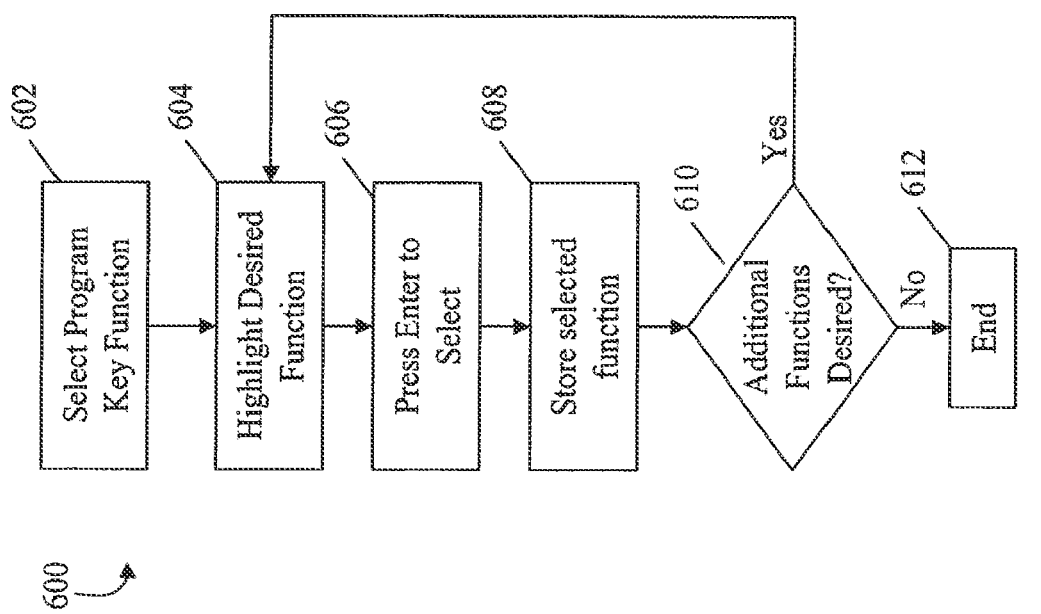
FIG. 6 is a block diagram of an exemplary methodology of programming a programmable key, or hot key.

FIG. 6 illustrates an exemplary methodology 600 of programming a programmable key or hot key. The methodology begins by selecting the program key function at block 602. Selecting the program key function can be accomplished by, for example, selecting the program key function from a menu, or pressing the programmable key and holding it down for a specified period of time, such as, for example 5 seconds or optionally pressing the program key prior to connecting the OBT to the vehicle. At block 604 the desired function to be programmed is highlighted. The function may be highlighted by, for example, scrolling down the list until the desired function is highlighted. Scrolling down can be accomplished by holding down the key for a period less than a predetermined time. At block 606 the desired function is selected by pressing an enter key, or by for example, holding the key down for longer than a predetermined time. The selected function is stored at block 608. The selected function is stored in non-volatile memory so that the programmed key need not be reprogrammed each time after the OBT is turned off. Optionally, the selected function is stored in volatile memory, and reprogrammed after the OBT is cycled on from an off state. At block 610 a determination is made whether additional functions are desired to be programmed. If additional functions are desired the process loops back to block 604. If no additional functions are desired, the methodology ends at block 612.

While the present invention has been illustrated by the description of embodiments thereof, and while the embodiments have been described in considerable detail, the scope of the appended claims should not be restricted or in any way limited to such detail. Additional advantages and modifications will readily appear to those skilled in the art. Therefore, the invention, in its broader aspects, is not limited to the specific details, the representative systems, and illustrative examples shown and described. Accordingly, departures may be made from such details without departing from the spirit or scope of the invention disclosed herein.

What is claimed is:

1. A diagnostic device for obtaining information from a vehicle diagnostic system comprising:
   an Off-board tool (OBT) having a single read/scan actuator button which upon being actuated performs either a read function or a scroll function; and
   the OBT comprises an internal memory to store information,
   wherein the function performed depends upon an amount of time the single read/scan actuator button is actuated,
   wherein the read function is automatically performed when the single read/scan actuator button is actuated for a first predetermined amount of time, and
   wherein the scroll function is automatically performed when the single read/scan actuator button is actuated for a second predetermined amount of time.

2. The diagnostic device of claim 1 wherein the OBT is one of a scan tool and a code reader.

3. The diagnostic device of claim 2 wherein the OBT is configured to electronically communicate with the vehicle diagnostic system and wherein performing the read function includes reading information from the vehicle diagnostic system.

4. The diagnostic device of claim 3 wherein the information comprises at least one Diagnostic Trouble Code (DTC).

5. The diagnostic device of claim 1 further including a display to display at least one piece of information.

6. The diagnostic device of claim 5 wherein performing the scroll function includes displaying at least one piece of information.

7. The diagnostic device of claim 6 wherein the piece of information includes at least one Diagnostic Trouble Code (DTC).

8. The diagnostic device of claim 1 wherein the internal memory stores a plurality of Diagnostic Trouble Code (DTCs) and wherein performing the scroll function includes displaying the next DTC stored in the memory.

9. The diagnostic device of claim 1 wherein the OBT includes an erase actuator which upon being actuated erases stored data in the vehicle diagnostic system.

10. The diagnostic device of claim 1 wherein the first predetermined amount of time is between about 2 seconds and about 10 seconds.

11. The diagnostic device of claim 1 wherein the first predetermined amount of time is about 5 seconds.

12. The diagnostic device of claim 1 wherein the first predetermined amount of time is greater than the second predetermined amount of time.

13. A diagnostic device configured to receive information from a vehicle diagnostic system comprising:
   a display configured to display information;
   an Off-board tool (OBT) having a single read/scan actuator button configured to perform either a read function or a scroll function upon being actuated; and
   the OBT comprises an internal memory to store information,
   wherein the read function is performed when the single read/scan actuator button is actuated for a first predetermined amount of time, and
   wherein the scroll function is performed when the single read/scan actuator button is actuated for a second predetermined amount of time.

14. The diagnostic device of claim 13 wherein the OBT is one of a scan tool and a code reader.

15. The diagnostic device of claim 14 wherein the OBT is configured to electronically communicate with the vehicle diagnostic system and wherein performing the read function includes reading information from the vehicle diagnostic system.

16. The diagnostic device of claim 15 wherein the information comprises at least one Diagnostic Trouble Code (DTC).

17. The diagnostic device of claim 13 wherein performing the scroll function includes displaying at least one piece of information.

18. The diagnostic device of claim 13 wherein the internal memory stores a plurality of Diagnostic Trouble Code (DTCs) and wherein performing the scroll function includes displaying the next DTC stored in the memory.

19. The diagnostic device of claim 13 wherein the first predetermined amount of time is between about 2 seconds and about 10 seconds.

20. The diagnostic device of claim 19 wherein the first predetermined amount of time is greater than the second predetermined amount of time.

* * * * *